J. B. GANT.
COTTON CHOPPER.
APPLICATION FILED JAN. 29, 1914.

1,132,656.

Patented Mar. 23, 1915.
2 SHEETS—SHEET 1.

WITNESSES:
C. A. Ellis
R. E. Bruckner.

INVENTOR
J. B. Gant
BY John M. Spillman
ATTORNEY

J. B. GANT.
COTTON CHOPPER.
APPLICATION FILED JAN. 29, 1914.

1,132,656.

Patented Mar. 23, 1915.
2 SHEETS—SHEET 2.

WITNESSES:
C. A. Ellis.
R. A. Bruckner.

INVENTOR
J. B. Gant
BY John M. Spellman
ATTORNEY

UNITED STATES PATENT OFFICE.

JESSE B. GANT, OF WHITNEY, TEXAS.

COTTON-CHOPPER.

1,132,656.  Specification of Letters Patent.  Patented Mar. 23, 1915.

Application filed January 29, 1914. Serial No. 815,190.

*To all whom it may concern:*

Be it known that I, JESSE B. GANT, a citizen of the United States, residing at Whitney, in the county of Hill and State of Texas, have invented certain new and useful Improvements in Cotton-Choppers, of which the following is a specification.

My invention relates to new and useful improvements in cotton choppers, and relates more particularly to such cotton choppers as are adapted to travel transversely of the rows of cotton, simultaneously producing a number of adjacent hills in each row.

It is another object of the invention to provide a cotton chopper of the above described type equipped with means for separately producing vertical adjustment of each earth turning member.

Another object of the invention is to provide a novel mechanism for maintaining the earth turning devices in their proper spaced relation, without restricting said members from undergoing a slight lateral movement in unison.

A still further object of the invention is to provide a device of the character described that will be strong, durable, efficient and simple and comparatively inexpensive to produce, also one in which the several parts will not be likely to get out of working order.

Figure 1:
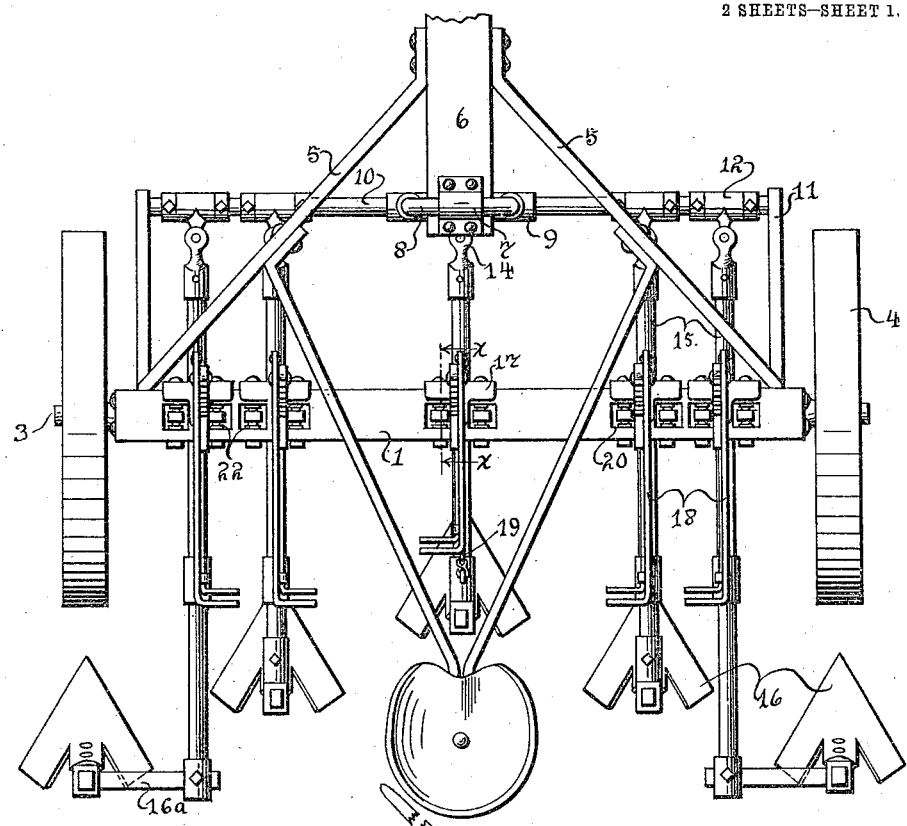
Figure 2:
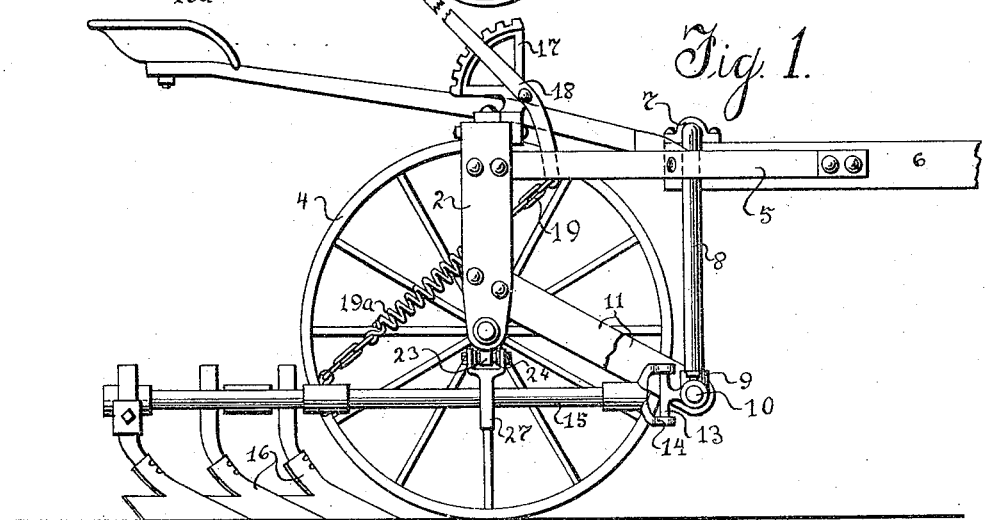
Figure 3:
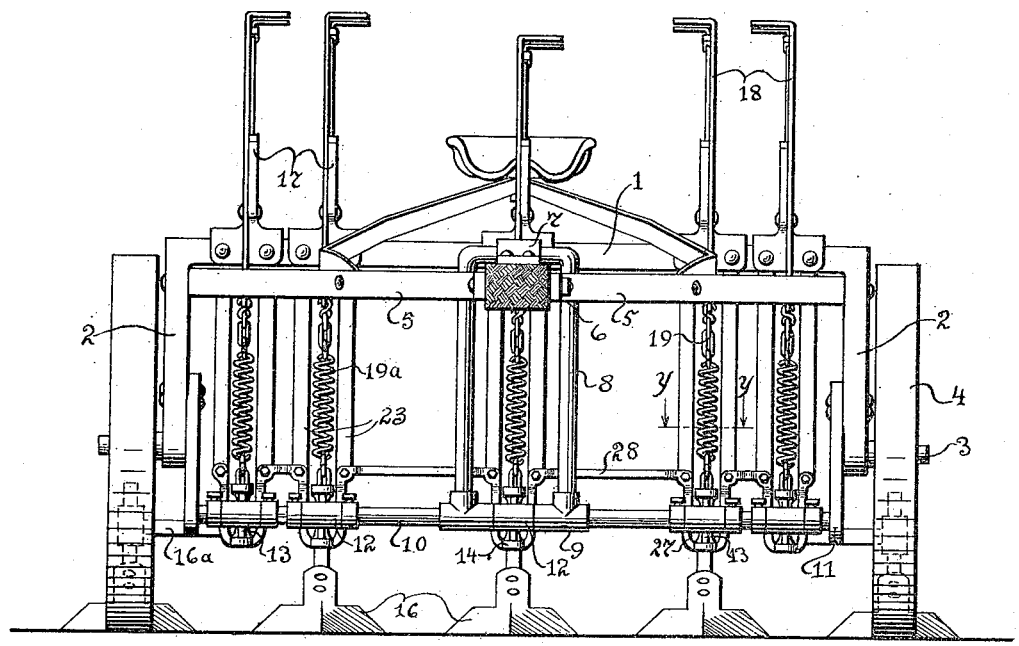
Figure 4:
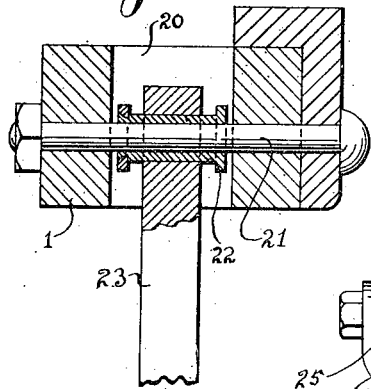
Figure 5:
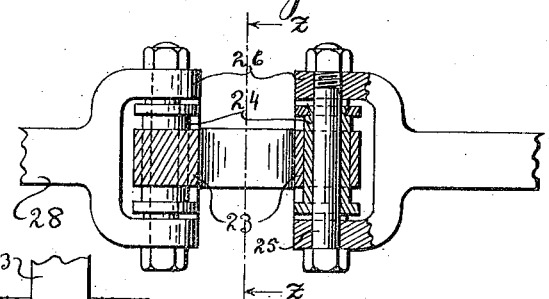
Figure 6:
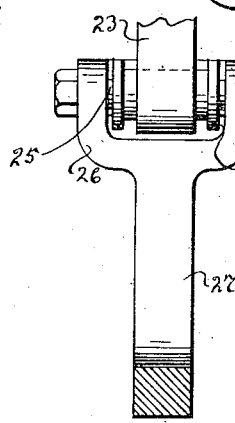

With the above and other objects in view, the invention has relation to certain novel features of construction and operation, an example of which is described in the following specification and illustrated in the accompanying drawings, wherein:

Figure 1 is a plan view of my cotton chopper. Fig. 2 is a view of the same in side elevation, the right hand wheel being omitted. Fig. 3 is a front view of the cotton chopper. Fig. 4 is a detail sectional view, the section being taken upon the line $x$—$x$ of Fig. 1. Fig. 5 is a detail sectional view, the section being taken upon the line $y$—$y$ of Fig. 3. Fig. 6 is a detail sectional view, the section being taken upon the line $z$—$z$ of Fig. 5.

Referring now more particularly to the drawings, wherein like reference characters designate similar parts in all the figures, the numerals 1 and 2 respectively denote the horizontal central portion and the downwardly extending end portions of an arched axle, and the numeral 3 designates a pair of spindles which respectively project rigidly outward from the lower extremities of the members 2. Upon each of the spindles 3, a transporting wheel 4 is rotatably mounted.

To the upper end portions of the members 2, there are respectively rigidly secured the rear extremities of two bars 5 which extend convergently forward and receive between their forward extremities the rear end of a tongue 6. Upon the rear end of the tongue 6, there is rigidly surmounted a bracket 7 serving to secure to the tongue the horizontal center portion of an arch bar 8. The two extremities of the member 8 carry pipe T's 9 through which is rigidly passed a horizontal rod 10 transverse with the direction of travel of the machine. The member 10 preferably will extend almost the entire width of the cotton chopper, and its extremities are rigidly connected by brace bars 11 with the vertical portions 2 of the axle. Upon the rod 10, there are loosely mounted five sleeves 12, one of said sleeves being disposed between the T's 9, and two being mounted upon each end portion of the rod. Integral with each sleeve 12 at the rear thereof, there is formed a vertical member 13, serving as a pivotal member to mount a yoke 14 rigidly carried by the forward end of a beam 15. The beams 15 will preferably be successively increased in length from the center beam to the outer ones, as is clearly shown in Fig. 1. Beneath the rear end of each beam 15, and in a rigid relation with the same, there is mounted a small plow 16 preferably of the wing sweep type. The two outermost plows 16 lie respectively behind the transporting wheel and are carried by bars 16$^a$ respectively projecting outwardly from the outermost beams 15.

Upon the portion 1 of the axle just above each beam 15, there is rigidly mounted a bracket 17 forming a pivotal support for the lever 18. From the lower extremity of each lever 18 a chain 19 is extended rearwardly at a downward inclination and intermediately connected at its rear end to the beams 15 lying beneath said lever. With each lever there is correlated the usual well known means for holding the lever adjusted in various positions of angular displacement. The means employed to hold the beams 15 and the plows carried thereby constantly spaced in a proper relation will now be described. Above each of the beams 15, there are formed, in the portion 1 of the axle, two slots 20 passing vertically through said member 1. Through each of said slots there is passed a bolt 21 parallel to the direction of travel of the machine, and passing loosely through a bushing 22 rigidly mounted in the upper extremity of a downwardly extending bar 23. Each bar 23 at its lower extremity carries a bushing 24 loosely receiving a bolt 25 parallel to the bolts 21. The extremities of each bolt 25 support a pair of lugs 26, and the two pairs of lugs 26 lying substantially above each beam are integrally connected by a U-shaped saddle 27 receiving said beam. The lugs 26 disposed above each beam are integrally connected with those disposed above the adjacent beams by horizontal members 28. Thus it is seen that the parts 26, 27 and 28 are all integral and serve to maintain the beams 15 in a constant spaced relation. Since however the member comprising the parts 26, 27 and 28 is supported by swinging bars 23, it is obvious that the beams will be free to undergo the slight lateral displacement relative to the balance of the machine that is essential, especially when the cotton chopper is making a turn.

From the above description, the manner of operation of my cotton chopper may be readily understood. As the machine travels across a field transversely of the rows of cotton, each of the plows 16 will cut in the rows a rectilinear series of spaces, and between these spaces in each row there will be left a hill of cotton plants the size of which will be determined by the spacing of the plows 16.

In case any obstacle or depression is encountered in the path of one of the plows, the operator by manipulating the lever 18 controlling the beam carrying said plow can elevate the plow to clear the obstacle or lower it to enter the depression. Owing to the fact that two of the plows are mounted respectively behind the transporting wheel, such plants as are crushed and broken down by the wheels as they travel across the rows, will be uprooted by the plows, and will not detract from the value of the plants. Each chain includes a coil spring 19ª which yieldably supports the plows and permits them to remain in the ground irrespective of the contour traversed by the wheels.

The invention is presented as including all such modifications and changes as properly come within the scope of the following claims.

What I claim is:

1. In a cotton chopper, the combination with a wheel supported arch axle and a tongue connected with the axle, of a support depending in front of the axle, a transverse rod carried by the support, a plurality of horizontal beams pivoted to the rod and extending rearwardly therefrom under the axle, a transverse space bar suspended from the axle and provided with a plurality of depressions each receiving one of the beams, and means for adjustably supporting each beam.

2. In a cotton chopper, the combination with a wheel supported arch axle and a tongue connected with the axle, of a support depending in front of the axle, a transverse rod carried by the support, a plurality of horizontal beams pivoted to the rod and extending rearwardly therefrom under the axle, a transverse space bar suspended from the axle and provided with a plurality of depressions each receiving one of the beams, a plurality of levers mounted on the axle and individual connections between the levers and the beams.

3. In a cotton chopper, the combination with a wheel supported arch axle and a tongue connected with the axle, of a support depending in front of the axle, a transverse rod carried by the support, a plurality of horizontal beams pivoted to the rod and extending rearwardly therefrom under the axle, a transverse space bar suspended from the axle and provided with a plurality of depressions each receiving one of the beams, adjusting levers mounted on the axle, and flexible connections extending from the levers to the beams and including a resilient element, there being a lever and connection for each beam.

4. A cotton chopper comprising an arch axle, a pair of transporting wheels carried by the axle extremities, a tongue having rigid connection with the axle, a rod supported transversely by the tongue beneath the rear extremity of the same, a plurality of beams extending rearwardly from said rod, and having pivotal connection with the same, a plow mounted upon the rear extremity of each beam, a saddle receiving each beam beneath the axle, a pair of laterally swinging bars supporting each saddle from the axle, and means maintaining said saddles in a constant spaced relation.

5. In a cotton chopper, the combination with a wheel supported arch axle, and a tongue connected with the axle, of a transverse rod suspended below the tongue, a plurality of plow beams pivoted to the rod and extending rearwardly under the axle, hangers depending from the axle, and a transverse space bar carried at the lower ends of the hangers and having a plurality of U-shaped saddles each receiving freely one of the beams, the space bar being integral and continuous from end to end, said space bar having yoke shaped portions pivotally receiving the lower ends of the hangers.

In testimony whereof I have signed my name to this specification in the presence of two subscribing witnesses.

JESSE B. GANT.

Witnesses:
C. A. ELLIS,
R. E. C. BRUCKNER.

Copies of this patent may be obtained for five cents each, by addressing the "Commissioner of Patents, Washington, D. C."